United States Patent Office 2,791,583
Patented May 7, 1957

2,791,583

AROMATIC SYNTHESIS FROM CO AND $H_2$

Herman I. Weck, Dyer, Ind., assignor to Standard Oil Company, Chicago, Ill., a corporation of Indiana No Drawing. Application December 23, 1954,
Serial No. 477,403

10 Claims. (Cl. 260—449)

This invention relates to a process for synthesizing aromatic hydrocarbons for carbon monoxide-hydrogen mixtures in the presence of improved catalysts.

Heretofore the synthesis of hydrocarbons from carbon monoxide-hydrogen gas mixtures has been effected with iron-type or alkali-promoted thoria catalysts and the hydrocarbon product has consisted essentially of paraffins and olefins with little, if any, aromatics. Such hydrocarbon products were of low octane number, were usually associated with large amounts of oxygenated products and were not suitable for use in premium motor fuels without expensive further catalytic conversion. An object of this invention is to provide a synthesis process, and particularly to provide improved synthesis catalysts, effective for converting hydrogen-carbon monoxide mixtures into liquid hydrocarbon products which are predominantly aromatic with only minor, if any, production of oxygenated hydrocarbons.

More recently, a so-called "isosynthesis" process has been investigated by Pichler et al. (Bureau of Mines Bulletin No. 488, 1950) who were primarily concerned with synthesis of branched chain hydrocarbons but who reported that chromia alumina catalysts produced liquid hydrocarbons which were almost entirely aromatic. The yields obtainable by Pichler et al. were only of the order of 5 to 10 grams per cubic meter of synthesis gas. An object of this invention is to provide an improved type of chromia alumina catalyst which will make possible a vast increase in aromatic hydrocarbon yield. Other objects will be apparent as the detailed description of the invention proceeds.

In accordance with this invention a mixture of hydrogen and carbon monoxide having a molar ratio in the range of about 1:4 to 4:1, preferably 1:1, is contacted with an improved metal oxide promoted chromia alumina catalyst at a temperature in the range of about 600° F. to about 900° F. at a pressure of at least about 400 p. s. i. g. and up to 10,000 p. s. i. g. or even higher, e. g. 25,000 p. s. i. g. at a space velocity (volume of gas per hour per volume of catalyst, the gas being measured under standard conditions) in the range of about 50 to about 5,000 in the case of fixed bed reactors and up to about 20,000 in the case of fluidized bed reactors. The optimum temperature is dependent on the particular metal oxide promoter employed but is usually in the range of about 650 to 850° F. and the preferred pressure is at least about 900 p. s. i. g. and preferably in the range of 900 to 9,000 p. s. i. g.

The improved catalyst of this invention is a chromia-on-alumina catalyst promoted by certain metal oxides either with or without the addition of a promotional amount of an acid-acting fluoride and/or chloride. The outstandingly superior metal oxide promoters are cobalt oxide and nickel oxide, either of which has been found vastly to increase the liquid aromatic hydrocarbon yield obtainable. Molybdenum and cerium oxides are also effective as added metal oxide promoters to the chromia alumina catalysts. The amount of chromia should be in the range of about 5 to 20, preferably 8 to 12, weight percent, the amount of additional metal oxide promoter should be in the range of .1 to 5, preferably 1 to 3, weight percent and the amount of acidic promoter such as fluorine is in the range of 0 to 1, preferably about .1 to .5, weight percent, the fluorine being added to the catalyst as HF or $NH_4F$ or as a salt of the additional promoter metal in an amount to give the desired concentration of additional promoter metal and fluorine. Alternatively, the fluorine, chlorine or halide-affording substance may be added continuously or intermittently with the charged gases at the rate of about 1 to 20 parts per million to produce the desired halide-promoting effect.

The alumina support for the catalyst should be substantially free from alkali metal contaminants, i. e. should contain less than .3 weight percent and preferably less than .1 weight percent of alkali metal oxide. Although alkali metal oxides are desired metal promoters for thoria and iron-type synthesis catalysts, even very small proportions of alkali metal oxide substantially prevent the formation of aromatic hydrocarbons when present in chromia alumina catalysts.

The types of alumina best suited for the catalyst support are the types of alumina employed commercially by manufacturers of synthetic alumina supports for platinum-type catalysts, such alumina usually being of the eta or gamma type. Methods for preparing such aluminas are described for example in U. S. 2,479,109 and 2,636,865. In order to insure that the alumina will be substantially free from alkali metal contaminants, the alumina is preferably made from pure aluminum metal or aluminum chloride and the precipitation, coagulation or gelation is effected with ammonium hydroxide instead of an alkali metal hydroxide or carbonate.

The chromia and metal oxide promoter may be incorporated by adding a soluble salt of such metals, such as nitrates thereof, to the alumina sol before or during precipitation. Alternatively, the alumina gel either in wet form, dried form, or after calcination, may be impregnated with water-soluble salts of chromium and promoter metal, respectively, in accordance with known practice. In the preferred method of catalyst preparation, a solution of the defined amounts of chromium nitrate, cobalt nitrate and hydrofluoric acid (when a fluoride is to be incorporated) are added to alumina sol prepared from metallic aluminum as described in U. S. 2,274,634 (Re. 22,196). The resulting mixture is stirred vigorously to insure complete mixing and during continued stirring at room temperature enough ammonium hydroxide solution is slowly added to bring the pH to approximately 7 to 8. The resulting gel is slowly dried in air at a temperature of about 185 to 250° F. and the dried gel is then calcined in air at about 900 to 1100° F. for about 4 hours. It should be understood that when a halide promoter is employed in addition to the metal oxide promoter for the chromia alumina catalyst, the halide may be incorporated prior to the incorporation of the chromia or promoter metal oxide, simultaneously therewith, or thereafter either prior to or after drying or calcining. Halide-promoted chromia alumina catalysts are described and claimed in a co-pending application Serial 363,514, filed June 23, 1953, and the halide promoters and method of incorporating them into the catalyst are the same in this invention as in said co-pending application.

The catalysts of this invention may be employed in fixed bed, moving bed or fluidized solids systems of any type known to those skilled in the art. To demonstrate the effectiveness of these catalysts, examples thereof were tested in apparatus comprising copper tubes inserted within vertical stainless steel reactors, a typical catalyst charge being 130 ml. The synthesis gas, which contained 50 mol percent of carbon monoxide, was passed downwardly through the fixed bed of catalyst and thence in sequence through three product separators operated respectively at 300° F., 80° F. and 32° F. In these particular examples the space velocity was 500 volumes of gas (measured under standard conditions) per hour per volume of catalyst at the indicated temperature and at a pressure of 900 p. s. i. g. The following data show results obtained under these conditions employing metal oxide-promoted chromia alumina catalysts containing 10 percent of chromia-on-alumina and the indicated amount of additional metal oxide promoter.

| Promoter | Aromatics,[1] Max. Yield, g./n. cu.m. | Yield of Other $C_5+$ Hdcns., g./n. cu.m. | Percent CO Conv. at Max. Yd. | Temp., °F., for Max. Yd. |
|---|---|---|---|---|
| 2% $Co_2O_3$+0.5% $NH_4F$ | 128 | 0 | 12 | 700 |
| 2% $Ni_2O_3$ | 107 | 5 | 19 | 800 |
| 2% $Ni_2O_3$+0.5% $NH_4F$ | 153 | 14 | 6 | 700 |
| 1% $MoO_3$ | 122 | 5 | 11 | 700 |
| 1% $MoO_3$+0.5% $NH_4F$ | 123 | 5 | 3 | 600 |
| 1% $Ce_2O_3$+0.5% $NH_4F$ | 103 | 5 | 10 | 700 |

[1] All yields are expressed as grams aromatics per normal cubic meter of $H_2$+CO consumed. The aromatic content of all liquid hydrocarbon products was determined by the fluorescent indicator adsorption technique.

From the above data it will be seen that remarkably high aromatics yields in grams per normal cubic meter of consumed $H_2$+CO are obtained when 1 to 2 percent of an additional metal oxide promoter is incorporated with the chromia alumina catalyst. Cobalt oxide and nickel oxide are shown to be outstanding promoters. Both in the case of nickel oxide and in the case of molybdenum oxide it will be observed that additional fluoride activation tends to increase the maximum yield obtainable but a lower temperature is required which results in less carbon monoxide conversion.

For maximum carbon monoxide conversion the reaction temperature should be of the order of about 900° F. but I have found that the maximum aromatics yields produced by consumed $H_2$+CO is obtainable at somewhat lower temperatures which are of the order of 600 to 800° F. where the catalysts are promoted by fluoride in addition to the added metal oxide promoter and about 650 to about 850° F. where the additional metal oxide promoter is employed in the absence of halide promoter. The aromatic yields at 900 p. s. i. g. are substantially higher than those obtainable at 400 p. s. i. g. and can be greatly increased by operating at still higher pressures of the order of 10,000 p. s. i. g. or more. In the foregoing table the "maximum" yields obtained were those employing the recited conversion conditions including the 500 space velocity and it will be apparent that still higher yields are obtainable by employing a space velocity to give increased carbon monoxide conversion in the temperature range shown to be effective for maximum yield.

The tabulated data also bring out the remarkable fact that the hydrocarbon product obtained under the defined operating conditions with my metal oxide-promoted chromia-on-alumina catalysts are almost exclusively aromatic hydrocarbons. In the case of the catalyst promoted by both cobalt oxide and ammonium fluoride, no significant amount of propane, butanes, pentanes or higher boiling paraffins or olefins were produced. In the case of the other catalysts, the amount of $C_3$+ hydrocarbons other than aromatics was usually of the order of 4 to 5 percent. This is in sharp contrast with prior hydrocarbon synthesis processes such as the Fischer-Tropsch process wherein the products were largely olefinic and paraffinic and the Pichler et al. isosynthesis process which was characterized by its large production of branched chain hydrocarbons.

As above indicated the halide promoter such as chlorine, HCl, fluorine, HF or alkyl halides may be introduced as a component of the gaseous charging stock in amounts in the range of about 1 to 20 parts per million instead of being initially incorporated in the catalyst. A trace of water, i. e. at least about 5 to 50 parts per million, is also desirable in the charging stock.

I claim:

1. In the process of synthesizing aromatic hydrocarbons by contacting a mixture of carbon monoxide and hydrogen at a pressure higher than 400 p. s. i. with a synthesis catalyst, the improved method of operation which comprises contacting said mixture of hydrogen and carbon monoxide with a chromia alumina catalyst promoted by about .1 to 5 weight percent of an oxide of a metal of the class consisting of cobalt, nickel, molybdenum and cerium and effecting said contacting at a temperature in the range of about 650° F. to about 850° F., said chromia alumina catalyst being substantially free from alkali metal oxide.

2. The method of claim 1 wherein the catalyst contains about 5 to 20 weight percent of chromia and is promoted with about 1 to 2 percent of nickel oxide.

3. The method of claim 1 wherein the catalyst contains about 5 to 20 weight percent of chromia and is promoted with about 1 to 2 percent of molybdenum oxide.

4. In the process of synthesizing aromatic hydrocarbons by contacting a mixture of carbon monoxide and hydrogen at a pressure higher than 400 p. s. i. with a synthesis catalyst, the improved method of operation which comprises contacting said mixture of hydrogen and carbon monoxide with a chromia alumina catalyst promoted by about .1 to 5 weight percent of an oxide of a metal of the class consisting of cobalt, nickel, molybdenum and cerium and also promoted by about .1 to 1 percent of an added halide, and effecting said contact at a temperature in the range of about 600° F. to about 800° F., said catalyst being substantially free from alkali metal oxide.

5. The method of claim 4 wherein the promoter metal oxide is cobalt oxide and the halide promoter is fluoride.

6. The method of claim 4 wherein the added metal oxide promoter is nickel oxide and the halide promoter is fluoride.

7. The method of claim 4 wherein the added metal oxide promoter is cerium oxide and the halide promoter is fluoride.

8. The method of synthesizing aromatic hydrocarbons from a mixture of hydrogen and carbon monoxide which comprises contacting said mixture with a synthesis catalyst under pressure of at least about 400 p. s. i. and at a temperature in the range of about 600° F. to 900° F. with a gas space velocity in the range of 50 to 5,000 volumes of gas per hour (measured at standard conditions) per volume of catalyst wherein said synthesis catalyst is a chromia alumina catalyst being substantially free from alkali metal oxide, which chromia alumina catalyst is promoted by about .1 to 5 percent of an oxide of a metal of the class consisting of cobalt, nickel, molybdenum and cerium.

9. The method of claim 8 wherein the synthesis catalyst is additionally promoted by about .1 to 1 percent of a halide.

10. The method of claim 8 which includes the step of adding about 1 to 20 parts per million of halide to the charging stock in order to obtain additional catalyst promoter effect.

References Cited in the file of this patent

UNITED STATES PATENTS

| 2,194,186 | Pier et al. | Mar. 19, 1940 |
| 2,435,551 | Black | Feb. 3, 1948 |

OTHER REFERENCES

Pichler et al.: "Bureau of Mines Bulletin No. 488," page 15 (1950).

Storch et al.: "The Fischer-Tropsch and Related Synthesis," page 225 (1951); published by John Wiley & Sons, New York, N. Y.